United States Patent
Kim et al.

(10) Patent No.: US 11,404,703 B2
(45) Date of Patent: Aug. 2, 2022

(54) CONDUCTIVE, ANTI-CORROSIVE MATERIAL

(71) Applicant: Robert Bosch GmbH, Stuttgart (DE)

(72) Inventors: Soo Kim, Cambridge, MA (US); Lei Cheng, Sunnyvale, CA (US); Georgy Samsonidze, San Francisco, CA (US); Mordechai Kornbluth, Brighton, MA (US); Jonathan Mailoa, Cambridge, MA (US); Sondra Hellstrom, East Palo Alto, CA (US); Boris Kozinsky, Waban, MA (US); Nathan Craig, Santa Clara, CA (US)

(73) Assignee: Robert Bosch GmbH, Stuttgart (DE)

( * ) Notice: Subject to any disclaimer, the term of this patent is extended or adjusted under 35 U.S.C. 154(b) by 309 days.

(21) Appl. No.: 16/452,866

(22) Filed: Jun. 26, 2019

(65) Prior Publication Data

US 2020/0411885 A1    Dec. 31, 2020

(51) Int. Cl.
*H01M 8/0206* (2016.01)
*H01M 8/0228* (2016.01)
*C01B 25/08* (2006.01)
*H01M 8/0297* (2016.01)

(52) U.S. Cl.
CPC ......... *H01M 8/0206* (2013.01); *C01B 25/088* (2013.01); *H01M 8/0228* (2013.01); *H01M 8/0297* (2013.01)

(58) Field of Classification Search
CPC ..... C01B 25/08; C01B 25/081; C01B 25/088; H01M 8/0206; H01M 8/0228; H01M 8/0297
See application file for complete search history.

(56) References Cited

U.S. PATENT DOCUMENTS

| | | | |
|---|---|---|---|
| 5,478,872 A  * | 12/1995 | Yamasoe | C08L 71/02 524/514 |
| 7,521,097 B2 | 4/2009 | Horne et al. | |
| 8,182,963 B2 | 5/2012 | Elhamid et al. | |
| 8,613,807 B2 | 12/2013 | Horie et al. | |
| 2010/0098956 A1 | 4/2010 | Sepeur et al. | |
| 2010/0200120 A1* | 8/2010 | Horie | C23C 30/00 148/237 |

(Continued)

OTHER PUBLICATIONS

Hamdy et al., The effect of grain refining and phosphides formation on the performance of advanced nanocomposite and ternary alloy coatings on steel, 2012, Materials Letters, 80, 191-194 (Year: 2012).*

(Continued)

*Primary Examiner* — Adam A Arciero
(74) *Attorney, Agent, or Firm* — Brooks Kushman P.C.

(57) ABSTRACT

A proton-exchange-membrane fuel cell bipolar plate includes a metal substrate having a bulk portion and a surface portion including an anticorrosive, conductive binary phosphide material having a formula (I):

$$A_xP_y \qquad (I),$$

where A is an alkali metal, alkaline earth metal, transition metal, post-transition metal, or metalloid, x, y is each a number independently selected from 1 to 15, and the binary phosphide material is configured to impart anticorrosive and conductive properties to the metal substrate.

20 Claims, 1 Drawing Sheet

(56) References Cited

U.S. PATENT DOCUMENTS

2012/0231374 A1    9/2012  Iseki et al.
2019/0348687 A1*  11/2019  Wakayama .........  H01M 8/0215

OTHER PUBLICATIONS

Long Liu et al., "Scalable and Cost-Effective Synthesis of Highly Efficient Fe2 N-Based Oxygen Reduction Catalyst Derived From Seaweed Biomass," Wiley, 2016, 12, No. 10, 1295-1301, www.small-journal.com.

Tao Sun et al., "Is iron nitride or carbide highly active for oxygen reduction reaction in acidic medium?", Dec. 2016, Catal. Sci. Technol., 2017, 7, 51-55 (htttps://pubs.rsc.org/en/content/articlehtml/2017/cy/c6cy01921h.

* cited by examiner

CONDUCTIVE, ANTI-CORROSIVE MATERIAL

TECHNICAL FIELD

The present disclosure relates to a thermodynamically stable, electrically conductive, chemically inert binary and/or ternary phosphide material capable of imparting anticorrosive properties onto a substrate in a chemically aggressive environment such as a fuel cell.

BACKGROUND

Metals have been a widely used material for thousands of years. Various methods have been developed to preserve metals and prevent their corrosion or disintegration into oxides, hydroxides, sulfates, and other salts. Metals in some industrial applications are especially susceptible to corrosion due to aggressive operating environments. A non-limiting example may be metal components of a fuel cell and its bipolar plate (BPP). In addition, certain components such as the BPP are required to be not only sufficiency chemically inert to resist degradation in the highly corrosive environment of the fuel cell, but also electrically conducting to facilitate electron transfer for the oxygen reduction reaction of the fuel cell. Finding a material that meets both the requirements has been a challenge.

SUMMARY

According to one embodiment, a proton-exchange-membrane fuel cell bipolar plate is disclosed. The bipolar plate includes a metal substrate having a bulk portion and a surface portion including an anticorrosive, conductive binary phosphide material having a formula (I):

$$A_xP_y \qquad (I),$$

where A is an alkali metal, alkaline earth metal, transition metal, post-transition metal, or metalloid, x, y is each a number independently selected from 1 to 15, and the binary phosphide material being configured to impart anticorrosive and conductive properties to the metal substrate. The corrosion resistance of the bipolar plate may be less than about 10 μA cm$^{-2}$ at about 80° C., at pH of about 2-3, with the presence of ~0.1 ppm of HF in the solution. A may be an element from the fourth or fifth period of the Periodic Table of elements. A may be a Group VIII.B element. Electrical conductivity of the material may be greater than about 100 S cm$^{-1}$. The surface portion may include at least about 50 wt. % of the binary phosphide. The bulk portion may be steel, graphite, aluminum, titanium, or copper. The surface portion may further include a dopant including at least one of N, C, or F.

In an alternative embodiment, a proton-exchange-membrane fuel cell bipolar plate is disclosed. The bipolar plate includes a metal substrate having a bulk portion and a surface portion including an anticorrosive, conductive ternary phosphide material having a formula (II):

$$A_xB_zP_y \qquad (II),$$

where A, B is each one of an alkali metal, alkaline earth metal, transition metal, post-transition metal, or metalloid, x, y, z is each a number independently selected from 1 to 15, and the material being configured to impart anticorrosive and conductive properties to the substrate. A and B may be both from VIII.B group of the Periodic Table of elements. At least one of A or B may be from the fourth or fifth period of the Periodic Table of elements. The surface portion may further include a dopant including at least one of N, C, or F. An interfacial contact resistance between the substrate and the material may be less than about 0.01 Ohm cm$^2$. Electrical conductivity of the material may be greater than about 100 S cm$^{-1}$. The corrosion resistance of the bipolar plate may be less than about 10 μA cm$^{-2}$ at about 80° C., at pH of about 2-3, with the presence of ~0.1 ppm of HF in the solution.

In yet another embodiment, an anticorrosive and conductive substrate is disclosed. The substrate may include a bulk portion and a surface portion material including a binary phosphide, ternary phosphide, or both having formulas (I), (II):

$$A_xP_y \qquad (I),$$

$$A_xB_zP_y \qquad (II),$$

where A, B is each one of an alkali metal, alkaline earth metal, transition metal, post-transition metal, or metalloid, x, y, z is each a number independently selected from 1 to 15. The surface portion material may be configured to impart corrosion resistance of less than about 10 μA cm$^{-2}$ at about 80° C., at pH of about 2-3, with the presence of ~0.1 ppm of HF in the solution and electrical conductivity greater than about 100 S cm$^{-1}$ to the substrate. The surface portion material may include both a binary and a ternary phosphide. A in both the binary and ternary phosphides may be the same element. A and B may be both from VIII.B group of the Periodic Table of elements. The surface portion material may further include a dopant including at least one of N, C, or F.

DETAILED DESCRIPTION

Figure 1:
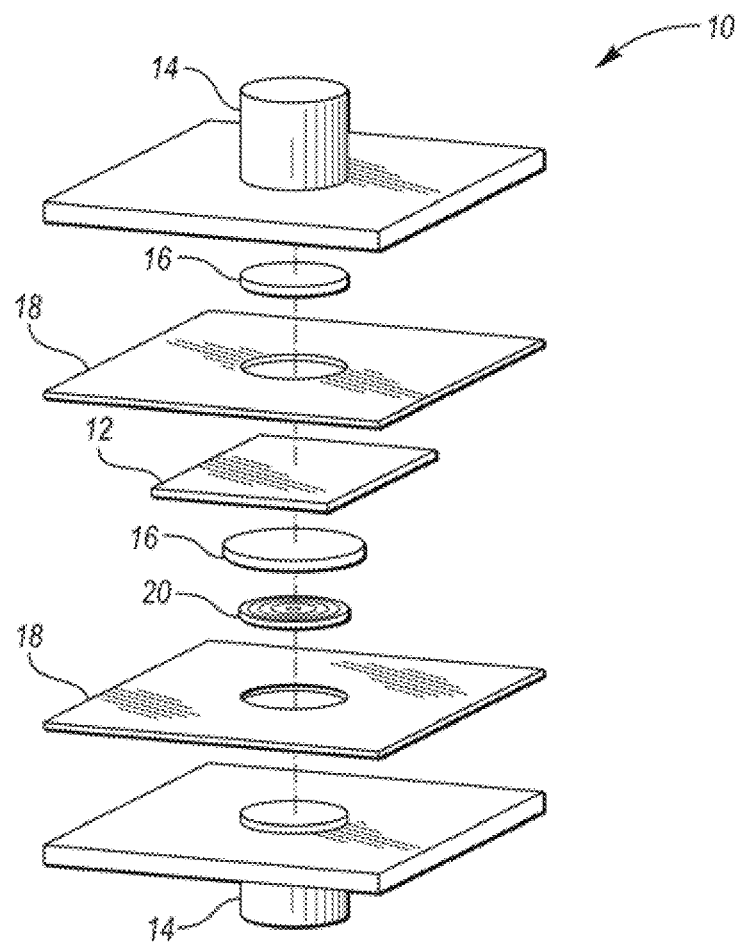
FIG. 1 depicts a schematic composition of a proton-exchange-membrane fuel cell including a bipolar plate according to one or more embodiments.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5%, or 10% of the value or relative characteristic.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. First definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Metals present a widely used group of materials in numerous industries including automotive, construction, home appliances, tools, pipes, railroad tracks, coinage, etc. Metals have been utilized for thousands of years and have remained a material of choice for certain applications due to their properties such as strength and resilience. Yet, corrosion of metals is a major source of fatigue and lifetime limitations for a number of applications using metals.

Corrosion is a natural process which converts a refined metal to a more chemically-stable form such as the metal's oxide(s), hydroxide(s), sulfide(s), and/or other salts. The conversion presents a gradual destruction of the metal material caused by electrochemical oxidation of the metal in reaction with an oxidant such as oxygen or sulfates. Corrosion may be invoked by exposure of the metal substrate to moisture in the air, to a solution with a relatively low pH, various chemical substances such as acids, microbes, elevated temperatures, and/or other factors. Especially in acidic environments, corrosion starts at the interface between a bulk metal material (e.g., steel) and a solution (e.g., ions dissolved in water or water surface layer which react to degrade the bulk material).

Many efforts have been made to prevent or slow down corrosion of metals. For instance, various types of coatings have been developed. Example coatings include applied coatings such as paint, plating, enamel; reactive coatings including corrosion inhibitors such as chromates, phosphates, conducting polymers, surfactant-like chemicals designed to suppress electrochemical reactions between the environment and the metal substrate, anodized surfaces, or biofilm coatings. Other methods of corrosion prevention include controlled permeability formwork, cathodic protection, or anodic protection.

Yet the most popular solution to the corrosion problem remains to be fortifying of the vulnerable metal surface with a coating. Most corrosion-resistant surfaces thus include one or more chemically inert coatings or protective layers that can slow down and/or at least partially prevent corrosion from occurring. Still, it has remained a challenge to find a material with substantial anticorrosion properties which would be also friendly to the environment, economical, while having superb performance characteristics.

Moreover, some applications are highly susceptible to corrosion due to their environmental factors. A non-limiting example of such application are proton-exchange-membrane fuel cells (PEMFC). The PEMFC represents an environmental-friendly alternative to internal combustion engines for a variety of vehicles such as cars and buses. The PEMFC typically features a relatively high efficiency and power density. A very attractive feature of the PEMFC engine are no carbon emissions, provided that the hydrogen fuel has been gained in an environmentally-friendly manner. Besides being a green engine, the PEMFC may be used in other applications such as stationary and portable power sources.

The PEMFC's own operating environment lends itself to corrosion for a variety of reasons. For example, low voltages exist between startups and shutdowns of the PEMFC, PEMFC has a strongly acidic environment, fluorine ions are released from the polymer membrane during operation of the PEMFC, both $H_2$ and $O_2$ exist at the anode during the startup and shutdown which causes high cathodic potential yielding cathodic corrosion, fuel crossover of hydrogen or oxygen from the anode to cathode or vice versa, etc. The PEMFC thus requires durable components capable of withstanding the above-mentioned conditions.

A non-limiting example of a PEMFC is depicted in FIG. 1. A core component of the PEMFC 10 that helps produce the electrochemical reaction needed to separate electrons is the Membrane Electrode Assembly (MEA) 12. The MEA 12 includes subcomponents such as electrodes, catalysts, and polymer electrolyte membranes. Besides MEA 12, the PEMFC 10 typically includes other components such as current collectors 14, gas diffusion layer(s) 16, gaskets 18, and bipolar plate(s) 20.

The bipolar plates or BPP 20 are implemented in a PEMFC stack to distribute gas, collect current, and separate individual cells in the stack from each other. The BPP 20 also provides additional functions such as removal of reaction products and water as well as thermal management within the PEMFC 10. The BPP 20 is also a relatively expensive component and a frequent reason for degradation of the PEMFC system. For example, BPPs may constitute about 60-80% of the stack weight, about 50% of the stack volume, and about 25-45% of the stack cost. To keep the cost low, the BPP 20 is typically made from metal, for example steel such as stainless steel. Alternative materials such as aluminum or titanium may be used. As the metal plates are susceptible to corrosion within the PEMFC system, efforts have been made to prevent the corrosion.

Additionally, in the PEMFC 10, the BPP 20 presents yet another material challenge as the BPP 20 is also required to be electrically conducting to facilitate electron transfer for the oxygen reduction reaction. Therefore, the BPP 20 material needs to be electrically conducting but chemically inert to reactions with ions present in the PEMFC 10 environment.

Typically, the BPP metal surface contains a coating such as graphite-like coating or protective oxide or nitride coatings to increase corrosion resistance of the BPP 20. The BPP's 20 surface may thus include elements such as Fe, Cr, Ni, Mo, Mn, Si, P, C, S, F, or a combination thereof. Alternative coatings include Ti alloy, doped $TiO_x$, $Cr_2O_3$, TiO$_2$, TiN, CrN, or ZrN. Yet, in an aggressively corrosive environment such as in the PEMFC 10, where coatings are more likely to degrade faster, a need remains for a coating or material that would be economically feasible, corrosion resistant, protective against acids such as HF at PEMFC operating temperature of about 80° C., electronically conductive, and capable of forming a coherent interface (i.e., a small interfacial contact resistance) with the metal substrates at the same time.

A metal phosphide material disclosed herein solves one or more problems described above and/or provides the benefits identified herein. Phosphides are compounds having P$^{3-}$ ion or its equivalent. Phosphides feature varied structures and properties. Phosphides may be binary monophosphides such as aluminum phosphide, zinc phosphide, calcium phosphide. Phosphides may be polyphosphides which contain P-P bond. Some polyphosphides have P$_2^{4-}$ ions, others may include P$_{11}^{3-}$ ions. While phosphorus has the common oxidation states of either 3−, 3+, or 5+, it may also have the oxidation state of 2−, 1−, 0, 1+, 2+, 4+, in addition to their common oxidation states, especially when chemically forming a metal phosphide.

It was surprisingly discovered that the phosphide material disclosed herein provides anticorrosion, conductive properties to a substrate such as the BPP metal substrate.

Figure 2:
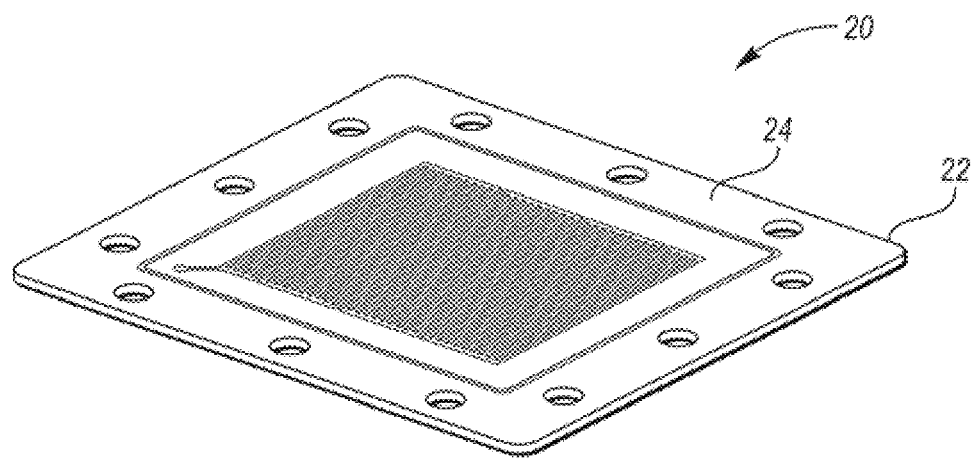
FIG. 2 shows a perspective view of a non-limiting example of a bipolar plate having a bulk portion and a surface portion including an anticorrosive and electrically conductive material according to one or more embodiments.

A non-limiting example of a BPP 20 is shown in FIG. 2. The BPP 20 represents a non-limiting example of a substrate having a solid body or bulk portion 22 and a surface portion 24. The bulk portion 22 may be formed from a metal such as steel, stainless steel, aluminum, copper, an alloy of two or more metals, the like, or a combination thereof. Alternatively, the bulk portion 22 may be formed from a composite material such as carbon-carbon composite, carbon-polymer composite. Alternatively still, the bulk portion 22 may be made from graphite.

The surface portion 24 includes an anticorrosive, chemically inert, electrically conductive, and thermodynamically stable material disclosed herein. The entire area of the surface portion 24 may include the material. Alternatively, the surface portion 24 may include one or more subportions which are free from the material. In an example embodiment, the entire surface portion 24 may include the material such that the entire BPP 20 is protected against corrosion. In other applications such as non-BPP applications, only a small portion of the surface portion 24 may include the material such as less than about ½, ¼, ⅛, 1/16, 1/32, or the like of the surface portion may include the material.

The surface portion 24 may include one or more layers of the disclosed phosphide material. The material thickness on the surface portion 24 may be adjusted according to the needs of a specific application. A non-limiting example of the material layer thickness may be about 0.1 to 0.8 μm, 0.2 to 0.6 μm, or 0.3 to 0.5 μm. Alternatively, the material may be layered to form a relatively thick deposit with dimensions of more than 1 μm on the surface portion 24 such as about or at least about 1.25, 1.5, 1.75, 2.0, 2.25, 2.5, 2.75, 3.0, 3.25, 3.5, 3.75, 4.0, 4.25, 4.5, 4.75, 5.0, 10, 15, 20, 25, 30, 35, 40, 45, 50, 55, 60, 65, 70, 75, 80, 85, 90, 95, 100, 110, 120, 130 140, 150, 200, 250 μm or about 1.25, 1.5, 1.75, 2.0, 2.25, 2.5, 2.75, 3.0, 3.25, 3.5, 3.75, 4.0, 4.25, 4.5, 4.75, 5.0, 10, 15, 20, 25, 30, 35, 40, 45, 50, 55, 60, 65, 70, 75, 80, 85, 90, 95, 100, 110, 120, 130 140, 150, 200, 250, 300, 350, 400, 450, or 500 nm. The material may form one or more layers or a plurality of layers on the bulk portion 22. The material may form 1, 2, 3, 4, 5, 6, 7, 8, 9, 10, or more layers on the bulk portion 22. Each layer may have a thickness within the nanoscale or microscale recited herein with respect to the thickness of the surface portion 24.

The disclosed phosphide material features at least the following properties: (1) thermodynamic stability, (2) electrical conductivity, and (3) chemical inertness. Thermodynamic stability ensures that the material does not easily decompose to other stable phase mixtures. Thermodynamic stability can be defined as whether the coating material is on its convex-hull in the chemical space of elements that make up the material. Thermodynamic stability also relates to the ability to successfully produce a stable material or synthesizability. To ensure that the material candidates may be accessed experimentally, only compounds with absolute 'zero' convex hull distance are considered for the purposes of this disclosure.

Regarding the second criteria, electrical conductivity may be expressed via a bandgap ($E_g$), also called an energy gap. The band gap refers to the energy difference between the top of the valence band and the bottom of conduction band. Substances with large bandgaps are typically insulators, and those with smaller bandgaps are called semiconductors. Conductors either have no bandgap (i.e., metallic) or very small bandgaps (i.e., semi-metallic). The material disclosed herein includes metals (i.e., zero bandgap) and other metal materials with relatively small bandgap (<1 eV). The material candidates that do not have 'zero' bandgap may be utilized as a BPP surface material as long as the material is designed to be sufficiently thin to remain conductive (i.e., thin enough so that electrons can pass through the material thickness) and/or can be doped with other elements to increase conductivity.

Chemical inertness relates to the material's reactivity with compounds present in the fuel cell environment such as H$_3$O$^+$, HF, and SO$_3^-$. For example, when the material is reacting with a dilute amount (δ) of HF, the material may decompose to more stable phase mixtures in the chemical space. To be considered "protective" or chemically inert against H$_3$O$^+$, HF, SO$_3^-$, and the like aggressive species in the fuel cell environment, more than about or at least about 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or more % of the original material remains among the decomposition species on the product side after the material comes in contact and reacts with H$_3$O$^+$, HF, and SO$_3^-$. Some of the metal and semi-metal phosphides may be protective against some of the species, for example H$_3$O$^+$, HF, but not fully protective against SO$_3^-$.

The material may include binary phosphides. The binary phosphides may be metal or semi-metal phosphides. The material may have the following general formula (I):

$$A_xP_y \qquad\qquad (I),$$

where

A is an alkali metal, alkaline earth metal, transition metal, post-transition metal, or metalloid, and x, y is each a number independently selected from 1 to 15.

A may be an element from groups I.A, II.A, III.A, IV.A, I.B, II.B, III.B, IV.B, V.B, VI.B, VII.B, VIII.B and/or the second, third, fourth, fifth, or sixth period of the Periodic Table of Elements. A may be an alkali metal such as Li, Na, K, Rb, Cs, an alkaline earth metal such as Mg, Ca, Sr, Ba, a transition metal such as Sc, Y, Ti, Zr, V, Nb, Cr, Mo, Mn, Fe, Co, Ni, Cu, Zn, a post-transition metal including Al, Ga, Sn, or a metalloid such as Si. A is a solid and not a liquid or gas. A is not phosphorus.

x, y may be any number from 1 to 15, including fractions, such as 1, 2, 3, 4, 5, 6, 7, 8, 9, 10, 11, 12, 13, 14, or 15. $1 \leq x, y \leq 15$. $x=y$, $x<y$, or $x>y$.

Alternatively, the material may include ternary phosphides. The ternary phosphides may be metal or semi-metal phosphides. The material may have the following general formula (II):

$$A_xB_zP_y \qquad (II),$$

where

A, B are each one of an alkali metal, alkaline earth metal, transition metal, post-transition metal, or metalloid, and x, y, z is each a number independently selected from 1 to 15.

A, B may each be an element from the same or different group of I.A, II.A, III.A, IV.A, I.B, II.B, III.B, IV.B, V.B, VI.B, VII.B, VIII.B and/or the second, third, fourth, fifth, or sixth period of the Periodic Table of Elements. A and B may be different elements. A, B may each be an alkali metal such as Li, Na, K, Rb, Cs, an alkaline earth metal such as Mg, Ca, Sr, Ba, a transition metal such as Sc, Y, Ti, Zr, V, Nb, Cr, Mo, Mn, Fe, Co, Ni, Cu, Zn, a post-transition metal including Al, Ga, Sn, or a metalloid such as Si. A, B are solids and not liquids or gases. A, B are not phosphorus.

x, y, z may each be any number from 1 to 15, including fractions, such as 1, 2, 3, 4, 5, 6, 7, 8, 9, 10, 11, 12, 13, 14, or 15. $1 \leq x, y, z \leq 15$. $y \geq x+z$, $x \geq y+z$, $z \geq x+y$, $x=z=y$, $y \leq x+z$, $x \leq y+z$, $z \leq x+y$, $y \geq x$ or $z$, $x \geq y$ or $z$, $z \geq x$ or $y$, $y \leq x$ or $z$, $x \leq y$ or $z$, or $z \leq x$ or $y$.

In at least some embodiments, the surface portion may include at least one binary and at least one ternary phosphide. The material may include a mixture of binary and ternary phosphides. The material may include more binary phosphides than ternary phosphides or vice versa.

EXAMPLES

To assess which phosphide material complies with all three property requirements listed above, high-throughput (HT) first-principles density functional theory (DFT) was used to calculate the results. Open materials databases, materialsproject.org (MP) and OQMD.org (OQMD), were used to screen for the optimal metal phosphide material/coatings for BPPs. While it is well established in literature that metastable materials with the convex hull distance less than 25 meV/atom may be accessed experimentally, only compounds with absolute 'zero' convex hull distance (in both MP and OQMD) were considered to ensure that the material candidates may be accessed experimentally with confidence. Regarding the second prong, the search focused on conducting materials including metals (i.e., zero bandgap) and other metal phosphides with relatively small bandgap (<1 eV). With respect to the third prong, a specific reaction pathway of the material was determined using the lowest energy path within the thermodynamic database.

For example, when titanium phosphide reacts with a dilute amount ($\delta$) of HF, titanium phosphide may decompose to more stable phase mixtures in the chemical space. The specific reaction pathway may be determined using the lowest energy path within the thermodynamic database: $TiP_2 + \delta HP \rightarrow xTiP_2 + yTiF_3 + zP + wH$ (where x, y, z, and w vary depending on $\delta$ and relative ground state phase compositions). $\delta=0.1$ was used to determine suitable phosphide materials. In addition, a reaction enthalpy ($\Delta H_{reaction}$ in eV/atom) corresponding to each reaction was assessed and the remaining amount of the material after the reaction takes place was determined.

The metal and semi-metal phosphide materials viable as conductive and anti-corrosive materials for use as BPP surface materials are listed in Tables 1-3 below. In Tables 1-3, the following abbreviations are used under the Notes section:

mb—moderate bandgap ($0<E_g<1$ eV);

hb—high bandgap (>1 eV);

d $H_3O$—decomposes when reacting with $H_3O^+$ such that >20% of the material transforms to other phase mixtures;

d HF—decomposes when reacting with HF such that >20% of the material transforms to other phase mixtures; and d $SO_3$—decomposes when reacting with $SO_3^-$ such that >20% of the material transforms to other phase mixtures.

Examples 1-28

TABLE 1

| | | | | $\Delta H_{reaction}$ [eV/atom] | | | |
|---|---|---|---|---|---|---|---|
| | | Stability | Bandgap | (mol % Material/Coating Remaining) | | | |
| Example | Materials | [meV/ | | | | | |
| No. | (Spacegroup) | atom] | [eV] | $H_3O$ | HF | $SO_3$ | Notes |
| 1 | $TiP_2$ (Pnma) | 0 | 0 | −0.986 (88%) | −1.056 (91%) | −1.211 (80%) | — |
| 2 | $VP_2$ (C2/m) | 0 | 0 | −0.786 3 (88%) | −0.833 (88%) | −1.006 (80%) | — |
| 3 | $CrP_4$ (C2/c) | 0 | 0 | −40.512 (593%) | −0.529 (96%) | −0.648 (87%) | — |
| 4 | $MnP_4$ (P-1) | 0 | 0.480 | −06.585 (973%) | −0.605 (95%) | −0.719 (87%) | mb |
| 5 | $Fe_3P$ (I-4) | 0 | 0 | −0.8468 (919%) | −0.483 (90%) | −0.638 (84%) | — |
| 6 | $FeP_2$ (Pnnm) | 0 | 0.434 | −0.725 (88%) | −0.763 (91%) | −0.918 (82%) | mb |
| 7 | $FeP_4$ (C2/c) | 0 | 0.804 | −0.595 (93%) | −0.615 (95%) | −0.717 (88%) | mb |
| 8 | $CoP_3$ (Im-3) | 0 | 0.279 | −0.705 (91%) | −0.733 (92%) | −0.837 (87%) | mb |
| 9 | $NiP_2$ (Pa-3) | 0 | 0 | −0.574 (88%) | −0.604 (91%) | −0.761 (81%) | — |
| 10 | $Ni_3P$ (I-4) | 0 | 0 | −0.549 (91%) | −0.568 (95%) | −0.688 (83%) | — |
| 11 | $NiP_3$ (Im-3) | 0 | 0 | −0.523 (91%) | −0.545 (92%) | −0.669 (86%) | — |
| 12 | $Ni_5P_4$ ($P6_3mc$) | 0 | 0 | −0.605 (96%) | −0.616 (96%) | −0.673 (93%) | — |
| 13 | $Ni_{12}P_5$ (I4/m) | 0 | 0 | −0.570 (98%) | −0.575 (99%) | −0.605 (94%) | — |
| 14 | $Cu_2P_7$ (C2/m) | 0 | 0.689 | −0.322 (96%) | −0.328 (97%) | −0.390 (93%) | mb |
| 15 | $CuP_2$ ($P2_1/C$) | 0 | 0.864 | −0.353 (88%) | −0.370 (92%) | −0.541 (81%) | mb |
| 16 | $Zn_3P_2$ ($P4_2/nmc$) | 0 | 0.314 | −0.332 (93%) | −0.350 (94%) | −0.490 (84%) | mb |
| 17 | $Rb_2P_3$ (Fmmm) | 0 | 0.764 | −0.617 (90%) | −0.649 (91%) | −0.780 (84%) | mb |
| 18 | $Sr_3P_4$ (Fdd2) | 0 | 0.886 | −1.103 (93%) | −1.147 (94%) | −1.257 (84%) | mb |
| 19 | $YP_5$ (Fm-3m) | 0 | 0.134 | −0.764 (91%) | −0.792 (94%) | −0.900 (87%) | mb |

TABLE 1-continued

Non-limiting Examples 1-28 of metal phosphides and their properties

| Example | Materials | Stability | Bandgap | $\Delta H_{reaction}$ [eV/atom] (mol % Material/Coating Remaining) | | | Notes |
|---|---|---|---|---|---|---|---|
| No. | (Spacegroup) | [meV/atom] | [eV] | $H_3O$ | HF | $SO_3$ | |
| 20 | $ZrP_2$ (Pnma) | 0 | 0 | −1.110 (87%) | −1.188 (91%) | −1.359 (81%) | — |
| 21 | $Zr_7P_4$ (C2/m) | 0 | 0 | −1.275 (90%) | −1.285 (96%) | −1.377 (88%) | — |
| 22 | $Nb_7P_4$ (C2/m) | 0 | 0 | −0.959 (90%) | −0.976 (95%) | −1.040 (89%) | — |
| 23 | $Mo_3P$ (I-42m) | 0 | 0 | −0.454 (91%) | −0.469 (94%) | −0.628 (82%) | — |
| 24 | $MoP_2$ ($Cmc2_1$) | 0 | 0 | −0.709 (88%) | −0.748 (91%) | −0.903 (83%) | — |
| 25 | $MoP_4$ (C2/c) | 0 | 0 | −0.559 52 (93%) | −0.578 (95%) | −0.680 (89%) | — |
| 26 | $Sn_4P_3$ (R-3m) | 0 | 0 | −026.225 (95%) | −0.234 (96%) | −0.330 (90%) | — |
| 27 | $SnP_3$ (R-3m) | 0 | 0 | −0.280 (93%) | −0.293 (94%) | −0.444 (83%) | — |
| 28 | $Ba_5P_4$ (Pnma) | 0 | 0.937 | −1.125 (88%) | −1.159 (93%) | −1.250 (88%) | — |

As can be seen from Table 1, the metal phosphides of Examples 1-28 listed above have the desirable three properties of thermodynamic stability, electrical conductivity, and chemical inertness against the corrosive species of the fuel cell. The phosphides may be optionally doped with N, C, F, and/or another elements to further enhance electronic conductivity. The doping may be especially beneficial for Examples 4, 6-8, 14-19, and 28 as these phosphide species have semi-conducting nature.

All of the phosphide species of Examples 1-28 tested above are thermodynamically stable with good protection against $H_3O^+$, HF, and $SO_3^-$. All of the species also have the relatively small bandgap of (<1 eV) with most of the species having bandgap of 0 eV. For all of the species in Table 1, more than 80 mol % of the material would not decompose when reacting with $H_3O^+$, HF, and $SO_3^-$. The metal phosphides identified in Table 1 are thus predicted to be stable, metallic or semi-metallic materials capable to withstand the corrosive environment of the fuel cell as a BPP surface material.

The metal phosphides recited in Table 1 may form a surface portion of a BPP. The surface portion may be up to several μm thick. A non-limiting example of the material layer thickness may be about 0.1 nm to 250 μm, 1 nm to 200 μm, or 10 nm to 100 μm. Alternatively, the surface portion may be about or at least about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 5.0, 10, 115, 20, 25, 30, 35, 40, 45, 50, 55, 60, 65, 70, 75, 80, 85, 90, 95, 100, 110, 120, 130, 140, 150, 200, 250 μm thick. The Examples 1-28 from Table 1 may be applied in nanoscale as well such that the thickness of the surface portion including one or more metal and semi-metal phosphides from Table 1 may be about or at least about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 5.0, 7.0, 10, 15, 20, 25, 30, 35, 40, 45, 50, 55, 60, 65, 70, 75, 80, 85, 90, 100, 120, 150, 180, 200, 220, 250, 280, 300, 320, 350, 380, 400, 420, 450, 480, 500, 520, 550, 580, 600, 650, 700, 750, or 800 nm thick.

Examples 29-47

TABLE 2

Non-limiting Examples 29-47 of metal or semi-metal phosphides and their properties

| Example | Materials | Stability | Bandgap | $\Delta H_{reaction}$ [eV/atom] (mol % Coating Remaining) | | | Notes |
|---|---|---|---|---|---|---|---|
| No. | (Spacegroup) | [meV/atom] | [eV] | $H_3O$ | HF | $SO_3$ | |
| 29 | $Li_3P$ ($P6_3$/mmc) | 0 | 0.700 | −0.797 (89%) | −0.857 (90%) | −1.062 (75%) | mb, d $SO_3$ |
| 30 | $Ca_3P$ (P-1) | 0 | 0.024 | −0.836 (88%) | −0.893 (90%) | −1.049 (54%) | mb, d $SO_3$ |
| 31 | $Ca_5P_8$ (C2/m) | 0 | 1.142 | −1.070 (96%) | −1.094 (96%) | −1.153 (89%) | hb |
| 32 | $V_2P$ (Pnma) | 0 | 0 | −0.874 (82%) | −0.928 (91%) | −1.147 (64%) | d $SO_3$ |
| 33 | $CrP_2$ (C2/m) | 0 | 0 | −0.667 (88%) | −0.631 (88%) | −0.854 (64%) | d $SO_3$ |
| 34 | $Cr_3P$ (I-4) | 0 | 0 | −0.464 (88%) | −0.481 (94%) | −0.677 (79%) | d $SO_3$ |
| 35 | MnP (Pnma) | 0 | 0 | −0.768 (81%) | −0.830 (85%) | −1.087 (70%) | d $SO_3$ |
| 36 | FeP (Pnma) | 0 | 0 | −0.756 (83%) | −0.811 (91%) | −1.037 (75%) | d $SO_3$ |
| 37 | $Fe_2P$ (P-62m) | 0 | 0 | −0.589 (88%) | −0.617 (94%) | −0.807 (76%) | d $SO_3$ |
| 38 | CoP (Pnma) | 0 | 0 | −0.744 (83%) | −0.798 (91%) | −0.992 (71%) | d $SO_3$ |

TABLE 2-continued

Non-limiting Examples 29-47 of metal or semi-metal phosphides and their properties

| Example Materials | | Stability | Bandgap | $\Delta H_{reaction}$ [eV/atom] (mol % Coating Remaining) | | | Notes |
|---|---|---|---|---|---|---|---|
| No. | (Spacegroup) | [meV/atom] | [eV] | $H_3O$ | HF | $SO_3$ | |
| 39 | $Co_2P$ (P-62m) | 0 | 0 | −0.649 (88%) | −0.681 (94%) | −0.835 (75%) | d $SO_3$ |
| 40 | $CoP_2$ (P2$_1$/c) | 0 | 0.436 | −0.724 (88%) | −0.762 (91%) | −0.898 (64%) | mb, d $SO_3$ |
| 41 | NbP (I4$_1$md) | 0 | 0 | −1.079 (83%) | −1.174 (90%) | −1.392 (76%) | d $SO_3$ |
| 42 | MoP (P-6m2) | 0 | 0 | −0.799 (83%) | −0.858 (91%) | −1.076 (75%) | d $SO_3$ |
| 43 | $Cs_2P_3$ (Fmmm) | 0 | 0.842 | −0.657 (84%) | −0.700 (83%) | −0.847 (42%) | mb, d $SO_3$ |
| 44 | $BaP_{10}$ (Cmc2$_1$) | 0 | 1.291 | −0.501 (96%) | −0.510 (97%) | −0.567 (92%) | hb |
| 45 | $Ba_3P_{14}$ (P2$_1$/c) | 0 | 1.761 | −0.720 (96%) | −0.733 (96%) | −0.775 (85%) | hb |
| 46 | $Ba_3P_4$ (Fdd2) | 0 | 0.482 | −1.091 (92%) | −1.135 (91%) | −1.244 (74%) | mb, d $SO_3$ |
| 47 | $BaP_3$ (C2/m) | 0 | 0.574 | −0.871 (83%) | −0.934 (82%) | −1.112 (41%) | mb, d $SO_3$ |

As can be seen from Table 2, the semi-metal phosphides of Examples 29-47 identified in Table 2 are predicted to be stable and thus synthesizable and protective against the corrosive environment of the fuel cell, but the materials are (1) either insulative such that the bandgap is above 1 eV, yet protective against the corrosive species $H_3O^+$, HF, and $SO_3^-$, or (2) electrically conducting, yet not protective against $SO_3^-$. More specifically, the following species belong under category (1): $Ca_5P_8$ (C2/m)—Example 31, $BaP_{10}$ (Cmc2$_1$)—Example 44, and $Ba_3P_{14}$ (P2$_1$/c)—Example 45. The remaining phosphides of Table 2 fall under category (2), where only 41 mol % to 79 mol % of the original phosphide material remains after reacting with $SO_3^-$.

Just like the phosphide species from Table 1, the phosphides of Examples 29-47 may be optionally doped with N, C, F, and/or another elements to further enhance electronic conductivity. The doping may be especially beneficial for Examples 29-31, 40, and 43-47 as these Example phosphide species have semi-conducting nature.

Based on the results, it is expected that the semi-metal phosphides of Example 29-47 should be applied as a thinner surface layer in nanoscale when compared with the metallic phosphides of Examples 1-28 of Table 1 to achieve a desired target electrical conductivity. A non-limiting example of the material layer thickness may be about 0.01 nm to 150 μm, 0.1 nm to 100 μm, or 1 nm to 50 μm. The surface portion/layer using one or more Examples 29-47 may be about or at least about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 5.0, 7.0, 10, 15, 20, 25, 30, 35, 40, 45, 50, 55, 60, 65, 70, 75, 80, 85, 90, 100, 120, 150, 180, 200, 220, 250, 280, 300, 320, 350, 380, 400, 420, 450, 480, 500 nm thick. Alternatively, the surface portion may be about or at least about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 5.0, 10, 115, 20, 25, 30, 35, 40, 45, 50, 55, 60, 65, 70, 75, 80, 85, 90, 95, 100 μm thick.

Examples 48-69

TABLE 3

Non-limiting Examples 48-69 of metal or semi-metal phosphides and their properties

| Example Materials | | Stability* | Bandgap* | $\Delta H_{reaction}$ [eV/atom]** (mol % Coating Remaining)** | | | Notes |
|---|---|---|---|---|---|---|---|
| No. | (Space Group) | [meV/atom] | [eV] | $H_3O$ | HF | $SO_3$ | |
| 48 | $Na_3P$ (P6$_3$/mmc) | 0 | 0.405 | −0.549 (77%) | −0.600 (86%) | −0.802 (78%) | mb, d $H_3O$, d $SO_3$ |
| 49 | $Mg_3P_2$ (Ia-3) | 0 | 1.607 | −0.810 (89%) | −0.848 (94%) | −1.028 (78%) | hb, d $SO_3$ |
| 50 | AlP (F-43m) | 0 | 1.630 | −0.800 (78%) | −0.879 (88%) | −1.216 (61%) | hb, d $H_3O$, d $SO_3$ |
| 51 | $SiP_2$ (Pbam) | 0 | 1.417 | −0.379 (84%) | −0.879 (91%) | −0.652 (75%) | hb, d $SO_3$ |
| 52 | $K_2P_3$ (Fddd) | 0 | 1.120 | −0.626 (87%) | −0.666 (88%) | −0.812 (61%) | hb, d $SO_3$ |

TABLE 3-continued

Non-limiting Examples 48-69 of metal or semi-metal phosphides and their properties

| Example No. | Materials (Space Group) | Stability* [meV/atom] | Bandgap* [eV] | $\Delta H_{reaction}$ [eV/atom]** (mol % Coating Remaining)** | | | Notes |
|---|---|---|---|---|---|---|---|
| | | | | $H_3O$ | HF | $SO_3$ | |
| 53 | $K_4P_3$ (Cmcm) | 0 | 0 | −0.534 (61%) | −0.558 (78%) | −0.690 (61%) | d $H_3O$, d HF, d $SO_3$ |
| 54 | ScP (Fm-3m) | 0 | 0 | −1.524 (78%) | −1.682 (88%) | −1.933 (61%) | d $H_3O$, d $SO_3$ |
| 55 | $Sc_3P_2$ (Pnma) | 0 | 0 | −1.437 (73%) | −1.453 (88%) | −1.684 (65%) | d $H_3O$, d $SO_3$ |
| 56 | TiP ($P6_3$/mmc) | 0 | 0 | −1.257 (75%) | −1.387 (85%) | −1.611 (50%) | d $H_3O$, d $SO_3$ |
| 57 | $Ti_4P_3$ (I4-3d) | 0 | 0 | −1.285 (74%) | −1.315 (89%) | −1.428 (66%) | d $H_3O$, d $SO_3$ |
| 58 | $Ti_3P$ ($P4_2/n$) | 0 | 0 | −1.031 (67%) | −1.042 (89%) | −1.295 (36%) | d $H_3O$, d $SO_3$ |
| 59 | $Ti_5P_3$ (Pnma) | 0 | 0 | −1.253 (75%) | −1.276 (89%) | −1.379 (67%) | d $H_3O$, d $SO_3$ |
| 60 | VP ($P6_3$/mmc) | 0 | 0 | −0.923 (78%) | −1.011 (85%) | −1.379 (56%) | d $H_3O$, d $SO_3$ |
| 61 | $V_3P$ ($P4_2/n$) | 0 | 0 | −0.759 (68%) | −0.783 (87%) | −0.986 (52%) | d $H_3O$, d $SO_3$ |
| 62 | CrP (Pnma) | 0 | 0 | −0.701 (75%) | −0.761 (85%) | −1.032 (39%) | d $H_3O$, d $SO_3$ |
| 63 | $Mn_2P$ (P-62m) | 0 | 0 | −0.638 (79%) | −0.678 (89%) | −0.888 (56%) | d $H_3O$, d $SO_3$ |
| 64 | $ZnP_2$($P4_32_12$) | 0 | 1.462 | −0.470 (88%) | −0.497 (93%) | −0.684 (66%) | hb, d $SO_3$ |
| 65 | GaP (F-43m) | 0 | 1.593 | −0.593 (83%) | −0.645 (89%) | −0.899 (73%) | hb, d $SO_3$ |
| 66 | YP ($P2_1/m$) | 0 | 0 | −1.636 (76%) | −1.800 (87%) | −2.073 (56%) | d $H_3O$, d $SO_3$ |
| 67 | ZrP ($P6_3$/mmc) | 0 | 0 | −1.427 (75%) | −1.564 (86%) | −1.826 (50%) | d $H_3O$, d $SO_3$ |
| 68 | $Zr_3P$ ($P4_2/n$) | 0 | 0 | −1.014 (76%) | −1.016 (90%) | −1.283 (73%) | d $H_3O$, d $SO_3$ |
| 69 | $Nb_3P$ ($P4_2/n$) | 0 | 0 | −0.758 (68%) | −0.778 (87%) | −0.978 (57%) | d $H_3O$, d $SO_3$ |

As is illustrated in Table 3, the phosphide species of Examples 48-69 are in general less protective against the respective corrosive species of the fuel cell environment than Examples 1-47. While all of the Examples 48-69 are thermodynamically stable and thus synthesizable, they are either insulating or not protective against at least one corrosive species. The Examples 48-69 may be used as a surface layer for BPP in a relatively thin layer/coating.

The surface portion including one or more Examples 48-69 may be about or at least about 0.01 nm to 150 μm, 0.1 nm to 100 μm, or 1 nm to 50 μm. The surface portion using one or more Examples 29-47 may be about or at least about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 5.0, 7.0, 10, 15, 20, 25, 30, 35, 40, 45, 50, 55, 60, 65, 70, 75, 80, 85, 90, 100, 120, 150, 180, 200, 220, 250, 280, 300, 320, 350, 380, 400, 420, 450, 480, 500 nm thick. Alternatively, the surface portion may be about or at least about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 5.0, 10, 115, 20, 25, 30, 35, 40, 45, 50, 55, 60, 65, 70, 75, 80, 85, 90, 95, 100 μm thick.

The phosphides of Examples 48-69 may be optionally doped with N, C, F, and/or other element(s) to further enhance electronic conductivity. The doping may be especially beneficial for Examples 48-52, 64, and 65 as these Example phosphide species.

The phosphides of Table 3 may be less protective initially, but may consume or scavenge the acidic species in the PEMFC environment, therefore, protecting the BPP bulk portion.

Alternatively still, all the herein-disclosed phosphides may be combined with other material having protective properties such as metal oxides, nitrides, carbides, fluorides or their combination. The surface portion 24 may thus include one or more metal phosphates and at least one other material such as an oxide, carbide, nitride, fluoride, or the like. For example, the surface portion may include about or at least about 1-99, 10-90, 20-80, 30-70, 40-60, or 50 wt. or vol. % of one or more phosphates disclosed herein and 1-99, 10-90, 20-80, 30-70, 40-60, or 50 wt. or vol. % of at least one other material.

For example, an insulating but protective material from Table 3 may be combined with electrically conducting material such as at least one electrically conducting oxide, nitride, carbide, or their combination.

The metal phosphides disclosed herein may further react with oxygen and/or water to form metal phosphates: $M(PO_4)_x$. Such metal phosphates may remain at the BPP surface, or dissolve in the acidic electrolytes. Dissolved metal phosphates may become phosphoric acids, which could either increase or decrease the pH of electrolytes, depending on the PEMFC operating conditions. Metal phosphates which react with oxygen and/or water may form a relatively thin passivation layer that may prevent further reaction.

Under very oxidizing conditions, some phosphides may react to form gaseous species. They may help protect the BPP by consuming and scavenging the acidic species that can cause further PEMFC degradation. Some of decomposed species of metal phosphides may be conducting which may help the electron transport in the PEMFC. Metal phosphides and/or their decomposed species may form a stable, conducting, and protective interphase layer on the BPP.

The corrosion resistance of the BPP including the metal bulk portion and the surface portion including the disclosed metal phosphide(s) may be about or less than about 0.1 to 20, 0.5 to 15, or 1 to 10 $\mu A\, cm^{-2}$ at 80° C., at pH=2 to 3, with the presence of ~0.1 ppm of HF in the solution. The corrosion resistance may be less than about 2.5, 1.75, 1.5, 1.25, 1, 0.75, 0.5, 0.25, or 0.1 $\mu A\, cm^{-2}$ under the same operating conditions.

The electrical conductivity of the BPP surface portion including the disclosed metal phosphide(s) may be about or greater than about 0.1 to 150, 1 to 120, or 10 to 100 $S\, cm^{-1}$, where the thickness of the surface portion including the disclosed metal phosphide(s) may be optimized to achieve the target conductivity. The electrical conductivity may be greater than about 80, 85, 90, 95, 100, 105, 110, 115, 120, 125, 130, 135, 140, 145, or 150 $S\, cm^{-1}$.

The interfacial contact resistance between the BPP bulk portion and the surface portion including the disclosed metal phosphide(s) may be about or less than about 0.001 to 0.1, 0.005 to 0.08, or 0.01 to 0.05 Ohm $cm^2$. The interfacial contact resistance may be less than about 0.05, 0.04, 0.03, 0.02, 0.01, 0.009, 0.008, 0.007, 0.006, 0.005, 0.004, 0.003, 0.002, 0.001 Ohm $cm^2$.

The BPP has been described as a suitable application for the disclosed phosphide material, but the material may be likewise suitable for additional applications. For example, the disclosed phosphide material may be used as part of surface portion of other industrial applications requiring a chemically inert, conductive material such as batteries, photovoltaics, consumer electronics, and/or anywhere else a conducting and inert oxide would be beneficial. The material's application is thus not limited to metals, but rather to any substrate requiring chemically inert and electrically conductive properties. The substrate may thus be glass, ceramic, composite, polymeric, and the like.

Additionally, a variety of methods to synthesize the anti-corrosive and electrically conductive phosphide materials are disclosed herein. In at least one embodiment, a method may include solution-based processes, electrochemical methods, heat treatment, or a combination thereof.

An example method may include dissolving metal-containing and phosphorous-containing precursor chemicals such as $M(NO_3)_x$, $M(OH)_x$, $MCl_x$, $NH_4HPO_4$, $(NH_4)_2HPO_4$, etc. either in water or organic solvents, then dispersing the same on the metal BPP between about 0 to 150, 20 to 120, or 40 to 100° C. with a various aging time of about 1, 2, 3, 4, 5, 6, 7, 8, 9, 10, 15, 20, 25, 30, 35, 40, 45, 50, 55, or 60 or more minutes. The reaction time can also vary and for example last about 1, 2, 3, 4, 5, 6, 7, 8, 9, 10, 12, 16, 24, or 48 hours. The pH of the solution may be controlled by the presence of oxidizing/reducing chemicals. The phosphorus-containing precursors may be metal phosphates ($MPO_4$; e.g., $FePO_4$) or metal phosphate hydrates ($MPO_4 \cdot xH_2O$) that can be reduced to metal phosphides under the reducing conditions.

Alternatively, the bulk area of the BPP such as stainless steel area may be polished and cleaned with an organic solvent such as ethanol. The method may then include electrochemically-depositing metal phosphides from the precursors. The working electrode is typically a stainless steel plate, where counter reference electrodes may vary depending on the voltage windows. Typically, Pt foil and/or Ag/AgCl (with saturated KCl) can be used as the counter and reference electrodes. The immersed electrolytic solution may be an acid with varied concentrations such as about 0.01 to 1 M sulfuric acid. The exact pH may be adjusted or neutralized as needed.

The heat treatment method may include heat treating a BPP metal such as stainless steel and/or other metals at about 200 to 1,500, 300 to 1,200, or 400 to 1,000° C. in a furnace with metal phosphide precursors with the presence of a mild oxidizing agent such as air or a reducing agent such as Ar, $N_2$, or $H_2$.

Alternatively still, the bulk portion of the BPP may be produced to contain a relatively high amount of phosphorus such that the bulk portion is P-rich and includes about or at least about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.25, 2.5, 2.75, 3.0, 3.25, 3.5, 3.75, 4.0, 4.25, 4.5, 4.75, 5.0, 5.5, 6.0, 6.5, 7.0, 7.5, 8.0, 8.5, 9.0, 9.5, 10.0 volume or weight % or more of P, based on the total volume or weight of the BPP or the bulk portion. The method may further include providing a sufficient amount of one or more metals or semi-metals designated in the formulas (I) and (II) as A, B such that the elements A, and/or B form phosphides disclosed herein when reacting with the phosphorus of the bulk portion.

Alternatively still, the metal phosphides may be deposited onto the bulk portion via solid-state route, pulsed laser deposition (PLD), atomic layer deposition (ALD), and/or chemical vapor deposition (CVD), etc.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A proton-exchange-membrane fuel cell bipolar plate comprising:
a metal substrate having a bulk portion and a surface portion comprising an anticorrosive, conductive binary phosphide material having a formula (I):

$$A_xP_y \qquad (I),$$

where A is V, Cr, Ni, Zr, Nb, Mo, or Sn; and x and y are each a number independently selected from 1 to 15, and the binary phosphide material being configured to impart anticorrosive and conductive properties to the metal substrate.

2. The bipolar plate of claim 1, wherein the corrosion resistance of the bipolar plate is less than 10 μA cm$^{-2}$ at about 80° C., at pH of 2-3, with the presence of 0.1 ppm of HF in the solution.

3. The substrate of claim 1, wherein A is Ni and $A_xP_y$ is $NiP_2$, $Ni_3P$, $NiP_3$, $Ni_5P_4$, $Ni_{12}P_5$, or a combination thereof.

4. The substrate of claim 1, wherein A is Zr and $A_xP_y$ is $ZrP_2$, $Zr_7P_4$, or a combination thereof.

5. The substrate of claim 1, wherein electrical conductivity of the material is greater than 100 S cm$^{-1}$.

6. The substrate of claim 1, wherein the surface portion comprises at least 50 wt. % of the binary phosphide.

7. The substrate of claim 1, wherein the bulk portion is steel, graphite, aluminum, titanium, copper, or a combination thereof.

8. The substrate of claim 1, wherein the surface portion further comprises a dopant including at least one of N, C, or F.

9. The substrate of claim 1, wherein A is Mo and $A_xP_y$ is $MoP_2$, $Mo_3P$, $MoP_4$, or a combination thereof.

10. The substrate of claim 1, wherein A is Sn and $A_xP_y$ is $Sn_4P_3$, SnP, or a combination thereof.

11. The substrate of claim 1, wherein A is Nb and $A_xP_y$ is $Nb_7P_4$.

12. A proton-exchange-membrane fuel cell bipolar plate comprising:
a metal substrate having a bulk portion and a surface portion including an anticorrosive, conductive ternary phosphide material having a formula (II):

$$A_xB_zP_y \qquad (II),$$

where A and B are each V, Cr, Ni, Zr, Nb, Mo, or Sn; x, y, and z are each a number independently selected from 1 to 15, and the material being configured to impart anticorrosive and conductive properties to the substrate.

13. The bipolar plate of claim 12, wherein the surface portion further comprises a dopant including at least one of N, C, or F.

14. The bipolar plate of claim 12, wherein an interfacial contact resistance between the substrate and the material is less than 0.01 Ohm cm$^2$.

15. The bipolar plate of claim 12, wherein electrical conductivity of the material is greater than 100 S cm$^{-1}$.

16. The bipolar plate of claim 12, wherein the corrosion resistance of the bipolar plate is less than 10 μA cm$^{-2}$ at about 80° C., at pH of 2-3, with the presence of 0.1 ppm of HF in the solution.

17. An anticorrosive and conductive substrate comprising:
a bulk portion; and
a surface portion material including a binary phosphide, ternary phosphide, or both having formulas (I) and (II):

$$A_xP_y \qquad (I),$$
$$A_xB_zP_y \qquad (II),$$

where A and B are each V, Cr, Ni, Zr, Nb, Mo, or Sn; and x, y, and z are each a number independently selected from 1 to 15, such that the surface portion material is configured to impart corrosion resistance of less than 10 μA cm$^{-2}$ at about 80° C., at pH of 2-3, with the presence of 0.1 ppm of HF in the solution and electrical conductivity greater than about 100 S cm$^{-1}$ to the substrate.

18. The substrate of claim 17, wherein the surface portion material includes both the binary and the ternary phosphide.

19. The substrate of claim 18, wherein A in both the binary and ternary phosphides is the same element.

20. The substrate of claim 17, wherein the surface portion material further comprises a dopant including at least one of N, C, or F.

* * * * *